(12) United States Patent
Hu et al.

(10) Patent No.: US 10,005,262 B2
(45) Date of Patent: Jun. 26, 2018

(54) HEAT SHRINKABLE POLYOLEFIN FILM AND A PREPARATION METHOD THEREOF

(71) Applicants: GUANGDONG DECRO FILM NEW MATERIALS CO., LTD., Guangdong (CN); GUANGDONG DECRO PACKAGE FILMS CO., LTD., Guangdong (CN)

(72) Inventors: Zhuorong Hu, Guangdong (CN); Xiaoming Zou, Guangdong (CN); Wenshu Xu, Guangdong (CN); Jianmin Zhu, Guangdong (CN); Xiongrui Ou, Guangdong (CN); Liping Rong, Guangdong (CN)

(73) Assignees: Guangdong Decro Film New Materials Co., Ltd., Guangdong (CN); Guangdong Decro Package Films Co., Ltd., Guangdong (CN)

(*) Notice: Subject to any disclaimer, the term of this patent is extended or adjusted under 35 U.S.C. 154(b) by 1035 days.

(21) Appl. No.: 14/369,337

(22) PCT Filed: Nov. 27, 2012

(86) PCT No.: PCT/CN2012/085352
§ 371 (c)(1),
(2) Date: Jun. 27, 2014

(87) PCT Pub. No.: WO2013/097570
PCT Pub. Date: Jul. 4, 2013

(65) Prior Publication Data
US 2014/0353197 A1 Dec. 4, 2014

(30) Foreign Application Priority Data

Dec. 30, 2011 (CN) .......................... 2011 1 0459955

(51) Int. Cl.
*B32B 1/02* (2006.01)
*B32B 27/08* (2006.01)
(Continued)

(52) U.S. Cl.
CPC .......... *B32B 27/08* (2013.01); *B29C 47/0057* (2013.01); *B29C 47/065* (2013.01);
(Continued)

(58) Field of Classification Search
CPC ..... B32B 1/02; B32B 27/32; B32B 2307/736; B32B 2250/242; B32B 2307/518;
(Continued)

(56) References Cited

U.S. PATENT DOCUMENTS 6,855,406 B2   2/2005   Takayasu et al.
2006/0159878 A1   7/2006   Wakai et al.

FOREIGN PATENT DOCUMENTS

CN   1442445 A   9/2003
CN   1802252 A   7/2006
(Continued)

OTHER PUBLICATIONS

E. Martuscelli et al.; "Effects of Chain Defects on the Thermal Behaviour of Polyethylene"; Polymer; 1974; vol. 15; May; pp. 306-314.
(Continued)

*Primary Examiner* — Marc A Patterson
(74) *Attorney, Agent, or Firm* — Potomac Law Group, PLLC

(57) ABSTRACT

The present invention relates to a biaxially oriented polyolefin multilayer heat shrinkable film, which is a multilayer heat shrinkable film with at least three laminated layers, and has internal and external surface layers of a resin composition comprising 70-80 wt % of an ethylene-norbornene copolymer having a glass-transition temperature (Tg) of
(Continued)

138° C. and a norbornene content of 76 wt %, and 20-30 wt % of an ethylene-propylene random copolymer having a melting point (Tm) of 140° C.; and a core layer comprising 54 wt % of an ethylene-propylene random copolymer having Tm of 140° C., 8 wt % of an ethylene-butylene random copolymer having Tm of 66° C., 20 wt % of an ethylene-norbornene copolymer having Tg of 78° C. and norbornene content of 65 wt %, and 18 wt % of a hydrogenated petroleum resin having softening point (Ts) of 140° C. The present invention provides a polyolefin heat shrinkable film and a method for preparing the same, the film has good temperature resistance, high transversal heat shrinkage rate, solves the problem that labels among bottles are easy to adhere between each other during hot filling drink or the problem about adhesion between labels and PE heat-shrinkable film in bundle-shrink pack of a group of bottles using the PE heat-shrinkable film, and is suitably used as label substrate material for contoured bottles.

15 Claims, 1 Drawing Sheet

(51) Int. Cl.
| | | |
|---|---|---|
| | *B32B 27/32* | (2006.01) |
| | *B29C 47/92* | (2006.01) |
| | *B29C 55/14* | (2006.01) |
| | *B29C 47/06* | (2006.01) |
| | *B65D 1/02* | (2006.01) |
| | *G09F 3/02* | (2006.01) |
| | *G09F 3/04* | (2006.01) |
| | *B29C 61/00* | (2006.01) |
| | *B32B 1/08* | (2006.01) |
| | *B29C 47/00* | (2006.01) |
| | *B29K 23/00* | (2006.01) |
| | *B29K 105/02* | (2006.01) |
| | *B29L 9/00* | (2006.01) |
| | *B29C 63/42* | (2006.01) |

(52) U.S. Cl.
CPC .............. *B29C 47/92* (2013.01); *B29C 55/14* (2013.01); *B29C 61/003* (2013.01); *B32B 27/32* (2013.01); *B32B 27/325* (2013.01); *B65D 1/0215* (2013.01); *G09F 3/02* (2013.01); *G09F 3/04* (2013.01); *B29C 47/0021* (2013.01); *B29C 63/423* (2013.01); *B29C 2947/92704* (2013.01); *B29K 2023/04* (2013.01); *B29K 2023/38* (2013.01); *B29K 2105/02* (2013.01); *B29L 2009/00* (2013.01); *B32B 2250/03* (2013.01); *B32B 2250/242* (2013.01); *B32B 2307/518* (2013.01); *B32B 2307/54* (2013.01); *B32B 2307/736* (2013.01); *B32B 2519/00* (2013.01); *G09F 2003/0251* (2013.01); *G09F 2003/0273* (2013.01); *Y10T 428/24942* (2015.01)

(58) Field of Classification Search
CPC ...... Y10T 428/1352; Y10T 428/24942; B65D 1/025; B29C 47/92; B29C 55/14
See application file for complete search history.

(56) References Cited

FOREIGN PATENT DOCUMENTS

| | | | |
|---|---|---|---|
| CN | 1960868 | A | 5/2007 |
| CN | 102015294 | A | 4/2011 |
| CN | 102529274 | A | 7/2012 |
| EP | 1632343 | A1 | 3/2006 |
| EP | 1717270 | A1 | 11/2006 |
| EP | 1747882 | A1 | 1/2007 |
| EP | 2799230 | A1 * | 11/2014 |
| JP | 6-27126 | | 4/1994 |
| JP | 2000-159946 | A | 6/2000 |
| JP | 2002-215044 | A | 7/2002 |
| JP | 2004-345244 | A | 12/2004 |
| JP | 2005-047182 | A | 2/2005 |
| JP | 2006-027052 | A | 2/2006 |
| JP | 2009-084378 | A | 4/2009 |
| JP | 2011-104816 | A | 6/2011 |
| JP | 2011104816 | A | 6/2011 |

OTHER PUBLICATIONS

International Search Report issued in the corresponding PCT application No. PCT/CN2012/085352 dated Mar. 7, 2013.
Office Action issued in the corresponding China application No. 201110459955.X dated Oct. 24, 2013.

* cited by examiner

HEAT SHRINKABLE POLYOLEFIN FILM AND A PREPARATION METHOD THEREOF

TECHNICAL FIELD

The present invention mainly relates to a heat shrinkable film comprising ethylene-propylene random copolymer, ethylene-norbornene copolymers with different norbornene contents and hydrogenated petroleum resin, and a method for preparing the same. More specifically, the present invention relates to a heat shrinkable biaxially oriented film with temperature resistance and heat shrinkage suitably useful as heat shrinkable sleeve label. The heat shrinkable film not only maintains features such as high temperature-resistant heat-shrinkage rate, integrated pattern after shrinkage, low density, lower natural shrinkage rate, easy in recovery, but also has improved temperature resistance required for hot filling soft drink or in bundle-shrink pack using PE heat-shrinkable film, and can be used as environment-friendly heat shrinkable sleeve label widely in high speed packing, steam tunnel shrink packing and PE bundle pack.

BACKGROUND ART

Beverages such as fruit juices and green-tea are usually filled in containers such as PET bottles for production and sales. Manufacturers usually put heat shrinkable sleeve labels with printed characters and/or patterns on container outside so as to distinguish from other goods or to improve identifiability and popularization. At present, commonly used heat shrinkable sleeve labels are mainly made from polyvinyl chloride (PVC) materials. PVC has merits such as high gloss, low haze, high stiffness and moderate heat shrinkage rate, less pattern deformation after shrink and natural shrinkage rate, and is often used as first choice for heat shrinkable sleeve labels, however, PVC has environmental problems such as difficult recovery, easy production of dioxin during combustion, and the use of PVC as label material is forbidden by explicit order in countries and regions such as Germany, Switzerland, Austria, Korea, Taiwan, etc. Currently, some developed materials such as biaxially oriented polyester (BOPET), biaxially oriented polystyrene (BOPS), biaxially oriented polyolefin (BOPO) are used as substitute products for PVC heat shrinkable sleeve labels.

However, both of BOPET (density: 1.28-1.32 g/cm$^3$) and BOPS (density: 1.02-1.04 g/cm$^3$) have density greater than 1 g/cm$^3$, so that when these materials are used as heat shrinkable sleeve labels, they can hardly be effectively separated for cyclic utilization from soft-drink bottles (which usually are PET materials, have density of 1.37-1.40 g/cm$^3$) by efficient & simple methods (e.g., density separation, or pneumatic separation).

Conventional biaxially oriented polyolefin (BOPO) material has low density (less than 1 g/cm3) favorable for easy recovery, less pollution in combustion products, so that it is a hot research spot of environment-friendly heat shrinkable film. However, it also has problems such as higher shrinkage temperature, especially mutual adhesion of labels among bottles during hot filing drink or adhesion between labels and PE heat-shrinkable film in bundle-shrink pack of a group of bottles using PE heat-shrinkable film, so that its application is remarkably restricted. In the meantime, conventional polyolefin heat-shrinkable film can only obtain 40% shrinkage above 110° C., while such temperature would result in deformation of PET bottles so that they cannot be used. For this, in order to solve high shrinkage temperature problem, Chinese Patent ZL03104526.X discloses that a shrinkable film as prepared with a composition, which comprises a copolymer obtained by random copolymerization of propylene and a $C_2$ to $C_{20}$ α-olefin, a random polypropylene resin and an alicyclic saturated hydrocarbon resin, has shrinkage rate of greater than 40% at 90° C. However, this patent dose not solve the problem in process of bundle-shrink pack of a group of bottles using PE heat-shrinkable film in practical production and sales sections of bottles (see: FIG. 1), so that it can hardly be applied in process of sleeve labeling to perform industrial production. Although the multilayer heat-shrinkable film as disclosed in Chinese Patent ZL200480015992.X is coated with acrylic resin on internal and external surfaces or further added with anti-blocking agent such as silicone oil, polyethylene wax, fluorinated wax so as to solve adhesion problem, but this process is complicated and high in cost and not suitable for industrial production.

Contents of the Invention

The present invention provides a heat shrinkable polyolefin film and a method for preparing the same, and the obtained film has good temperature resistance, high transversal heat shrinkage rate, labels among bottles are not easy to adhere between each other during hot filling drink or the problem of adhesion between labels and PE heat-shrinkable film is not easy to arise in bundle-shrink pack of a group of bottles using the PE heat-shrinkable film.

The specific technical solution is: a multilayer heat shrinkable film, which is a multilayer heat shrinkable film with at least three laminated layers, comprises internal and external surface layers of a resin composition comprising 70-80 wt % of an ethylene-norbornene copolymer having a glass-transition temperature (Tg) of 138° C. and a norbornene content of 76 wt %, and 20-30 wt % of an ethylene-propylene random copolymer having a melting point (Tm) of 140° C.; and a core layer comprising 54 wt % of an ethylene-propylene random copolymer (A) having Tm of 140° C., 8 wt % of an ethylene-butylene random copolymer (B) having Tm of 66° C., 20 wt % of an ethylene-norbornene copolymer (C) having Tg of 78° C. and norbornene content of 65 wt %, and 18 wt % of a hydrogenated petroleum resin (D) having softening point (Ts) of 140° C.

In addition, the multilayer heat shrinkable film is further characterized in that: internal and external sub-surface layers are disposed between the core layer and internal and external surface layers, the internal and external sub-surface layers comprise 60-90 wt % of an ethylene-norbornene copolymer having Tg of 78° C. and norbornene content of 65 wt %, and 10-40 wt % of a hydrogenated petroleum resin having softening point of 140° C.

The core layer and the internal and external sub-surface layers use same ethylene-norbornene copolymer having Tg of 78° C. and norbornene content of 65 wt %; the internal and external surface layers use same ethylene-norbornene copolymer having Tg of 138° C. and norbornene content of 76 wt %. Both of the above ethylene-norbornene copolymers have melt volume rate (MVR) of 11 cm3/10min.

The ethylene-propylene random copolymer has ethylene content of 6.5 wt %, melt index of 2 g/10 min (2.16 kg, 230).

The ethylene-butylene random copolymer has butylene content of 25 wt %, melt index of 3.6 g/10 min (2.16 kg, 190° C.).

The hydrogenated petroleum resin is C9 type resin having softening point of 140° C.

In addition, the multilayer heat shrinkable film is further characterized in that: its transversal heat shrinkage rate is not less than 40% under condition of being dipping in 90° C. water for 10 seconds.

In addition, the multilayer heat shrinkable film is further characterized in that: its longitudinal fracture nominal strain is 282-291%.

In addition, the multilayer heat shrinkable film is further characterized in that: its transversal tensile strength of is 115-134 MPa.

In addition, the multilayer heat shrinkable film is further characterized in that: its transversal tensile elastic modulus is 1419-1530 MPa.

In addition, the multilayer heat shrinkable film is further characterized in that: labels among bottles are not easy to adhere between each other during hot filling drink or the problem of adhesion between labels and PE heat-shrinkable film is not easy to arise in bundle-shrink pack of a group of bottles using the PE heat-shrinkable film.

The aim of disposing the internal and external surface layers in the present invention is to increase temperature resistance of the heat shrinkable film, so that the ethylene-norbornene copolymer and the ethylene-propylene random copolymer with higher temperature resistance are chosen, but they may reduce the heat shrinkage rate of the film. The thickness of the internal or external surface layer, or the sum of thickness of the internal or external surface layer and the thickness of the respective adjacent sub-surface layer should be controlled as about 7 μm; if it is too thin, labels may crack at joints in heat shrinkage molding process due to insufficient bonding strength of internal and external surface layers at joints after seaming processing that overlap label sheet at joints to form a sleeve; while if it is too thick, the heat shrinkage rate of film may decrease due to the increase of temperature resistance of surface layer materials. The internal and external surface layers use 70-80 wt % of an ethylene-norbornene copolymer having Tg of 138° C. and density of 1.02 g/cm3, and 20-30 wt % of an ethylene-propylene random copolymer having Tm of 140° C.

The aim of disposing the internal and external sub-surface layers is to increase bonding strength of internal and external surface layers at joints after seaming processing that overlap label sheet at joints to form a sleeve by using cyclohexane solvent, and to increase heat shrinkage rate and glossiness of the film. The internal and external sub-surface layers comprise 60-90 wt % of an ethylene-norbornene copolymer having Tg of 78° C. and norbornene content of 65 wt %, and 10-40 wt % of a hydrogenated petroleum resin having softening point of 140° C.

The aim of disposing the core layer is to obtain high heat shrinkage rate, so that the core layer has components comprising 54 wt % of an ethylene-propylene random copolymer (A) having Tm of 140° C., 8 wt % of an ethylene-butylene random copolymer (B) having Tm of 66° C., 20 wt % of an ethylene-norbornene copolymer (C) having Tg of 78° C. and norbornene content of 65 wt %, and 18 wt % of a hydrogenated petroleum resin (D) having softening point of 140° C. The function of the component A is to enhance tensile strength and elastic modulus of the film; the function of the component B is to increase impact strength of the film; the function of the component C is to increase heat shrinkage rate of the film; and the function of the component D is to improve the heat shrinkage rate and stretchability of the film.

In the meantime, the present invention further provides a method for preparing the multilayer heat shrinkable film, comprising the following steps: premixing the selected raw materials in a designed formulation to form a homogeneous melt; co-extruding the melt through a die; and manufacturing the film by flat-die process, i.e., chilling the extruded melt to form a cast sheet, and then biaxially orienting the cast sheet to form a film, or by bubble forming process, i.e., chilling the melt after leaving the die to form an initial bubble, and then blowing transversally and stretching longitudinally the initial bubble, to form a film; cooling the film, and treating the cooled film with corona or flame, to obtain film product.

If transversal heat shrinkage is required, a flat-die process in a manner of firstly longitudinally stretching and then transversally stretching can be adopted, its specific technological process is as follows:

Supplying materials→co-extruding with several extruders→combining at T-die→chilling and molding→longitudinally stretching (pre-heating, slightly stretching, fixing size)→transversally stretching (pre-heating, significantly stretching, fixing size, cooling)→drawing and surface treating→winding→aging treatment→slitting and winding→packaging The polyolefin heat shrinkable film is prepared according to the following method: raw materials of components according to structure of co-extrusion film with three or more layers are inhaled in a batching unit, metered by electronic scales and sent into an extruder at about 250° C., they are melted, plasticized and metered, enter a flow block, then are extruded through a T-die, casted by passing a chill roll at about 25° C. to form a cast sheet, then longitudinal stretching is performed, the pre-heating temperature and stretching temperature for longitudinal stretching are both about 100° C., annealing temperature is about 110° C., and stretch rate is about 1.2; then transversal stretching is performed, the pre-heating temperature for transversal stretching is about 115° C., stretching temperature is about 85° C., annealing temperature is about 70° C., wind cooling temperature is about 25° C., and stretch rate is about 5.5; then the obtained film is subjected to corona treatment so that the film surface has a surface tension of 43 dyne/cm or more, following winding and slitting, and finally packed and stored.

In the method, the stretch rate for longitudinal stretching is about 1.2, temperature for pre-heating and stretching is about 100° C., because excessive stretch or low stretching temperature may result in too great longitudinal stretch shrinkage rate which would influence shrinking effects during sleeve labeling. The stretch rate for transversal stretching is about 5.5, stretching temperature is 85° C. or below. Usually, the larger the stretch rate and the lower the stretching temperature are, the higher the film heat shrinkage rate is. However, the use of excessively high stretch rate or excessively low stretching temperature may result in film fracture and thus production is not stable.

The present invention also provides a container, which comprises: container body and the above multilayer heat shrinkable film that is attached on the container body by means of heat shrinkage.

The present invention provides a polyolefin heat shrinkable film and a method for preparing the same. The film has good temperature resistance, high transversal heat shrinkage rate, and solves the problem that labels among bottles are easy to adhere between each other during hot filling drink or the problem about adhesion between labels and PE heat-shrinkable film in bundle-shrink pack of a group of bottles using the PE heat-shrinkable film, and is suitably used as label substrate material for contoured bottles.

The physical property indexes used in the present invention are measured according to the following criteria:
(1) Measurement of thickness: performed according to GB/T 6672-2001.
(2) Measurement of tensile strength and fracture nominal strain: performed according to Section 5.6 of GB/T 10003-2008.
(3) Measurement of heat shrinkage rate:
In environment of constant temperature (23° C.), constant humidity (humidity: 55%), 10 pieces of 100 mm×100 mm samples are separately cut in longitudinal direction and transversal direction, their lengths L1 in longitudinal direction and transversal direction are separately measured. After dipping in (90±1)° C. water for 10 sec, they are immediately taken out and placed in constant temperature water bath at (25±1)° C. and cooled for 1 min, then taken out and dried in air for 5 min, and their lengths L2 in longitudinal direction and transversal direction are measured.

Heat shrinkage rate is calculated according to formula (1), and arithmetic mean value of 10 samples is used as result:

$$X = \frac{L_1 - L_2}{L_1} \times 100\% \quad (1)$$

wherein:
X—heat shrinkage rate, which unit is percentage (%);
L1—length of sample in longitudinal direction and transversal direction before heat shrinkage, which unit is millimeter (mm);
L2—length of sample in longitudinal direction and transversal direction after heat shrinkage, which unit is millimeter (mm);
(4) Measurement of friction coefficient: performed according to GB/T 10006.
(5) Measurement of elastic modulus for longitudinal and transversal stretch: the shape, size and preparation method of samples are in accordance with GB/T 1040.3. The measurement of samples is performed according to Chapter 9, GB/T 1040.1-2006.
(6) Measurement of surface tension: performed according to GB/T 14216.
(7) Measurement of haze: performed according to GB/T 2410.
(8) Measurement of glossiness: performed according to GB/T 8807, angle of incidence is 45°.
(9) Adhesion test of bundle-shrink pack using PE heat-shrinkable film: PET bottles filled with drink and sleeve labelled by heat shrinkage are divided into groups, 24 bottles per group, and bundle-shrink packed using PE heat-shrinkable film, each group of bottles is placed in 180° C. drying tunnel for 2 sec, and then taken out and visually evaluated, those not adhered to PE heat-shrinkable film are marked with symbol " ", while those adhered to PE heat-shrinkable film are marked with symbol "X".

MODE FOR CARRYING OUT THE INVENTION

EXAMPLE 1

Figure 1:
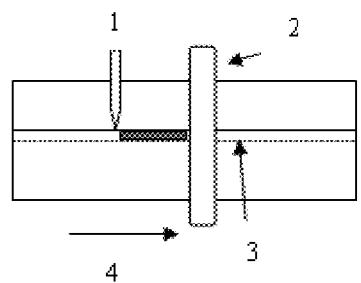
FIG. 1: a schematic diagram of overlapping heat shrinkable label sheet at joints to form a sleeve.
1—coating head, 2—press roll, 3—overlap joint, 4—direction of machine run.
Figure 2:
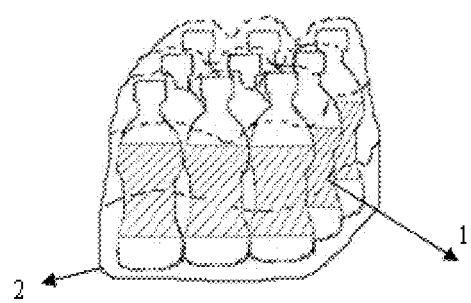
FIG. 2: a schematic diagram of bundle-pack of filled PET bottles using PE heat-shrinkable film.
1—heat shrinkable sleeve labels, 2—PE heat-shrinkable film.
Figure 3:
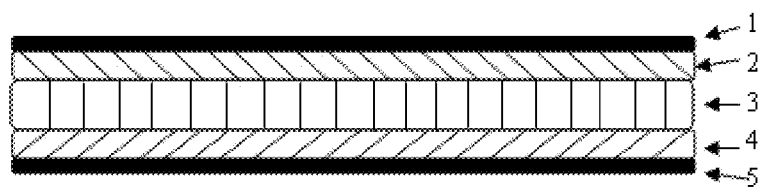
FIG. 3: a structural diagram of the multilayer heat shrinkable film of a preferable example of the present invention.
1—external surface layer, 2—external sub-surface layer, 3—core layer, 4—internal sub-surface layer, 5—internal surface layer.
Figure 4:
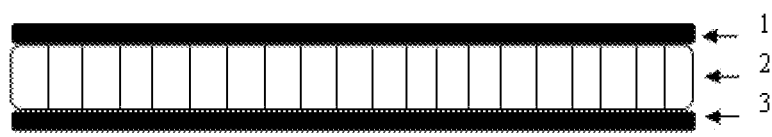
FIG. 4: a structural diagram of the multilayer heat shrinkable film of Example 4 of the present invention.
1—external surface layer, 3—core layer, 5—internal surface layer.

A polyolefin heat shrinkable film had a five-layered co-extrusion structure (see: FIG. 3), comprising internal and external surface layers, internal and external sub-surface layers and core layer. The internal and external surface layers were composed of 70 wt % of ethylene-norbornene copolymer having Tg of 138° C. and norbornene content of 76 wt % (manufactured by Treasure Plastic Co., Ltd, TOPAS 6013F-04), and 30 wt % of ethylene-propylene random copolymer having Tm of 140° C. (manufactured by Lyondell Basell Company, CLYRELL RC1890). The internal and external sub-surface layers were composed of 90 wt % of ethylene-norbornene copolymer having Tg of 78° C. and norbornene content of 65 wt % (manufactured by Treasure Plastic Co., Ltd, TOPAS 8007F-400), and 10 wt % of hydrogenated petroleum resin having Ts of 140° C. (manufactured by Idemitsu Kosan Co., Ltd, P140). The core layer composition was composed of 54 wt % of ethylene-propylene random copolymer having Tm of 140° C. (manufactured by Lyondell Basell Company, CLYRELL RC1890), 20 wt % of ethylene-norbornene copolymer having Tg of 78° C. and norbornene content of 65 wt % (manufactured by Treasure Plastic Co., Ltd, TOPAS 8007F-400), 8 wt % of ethylene-butylene random copolymer having Tm of 66° C. (manufactured by Mitsui Chemicals Inc, A4085S), and 18 wt % of a hydrogenated petroleum resin having Ts of 140° C. (manufactured by Idemitsu Kosan Co., Ltd, P 140).

The polyolefin heat shrinkable film was prepared by the following method: raw materials for blending were separately poured into extruder at 250° C., co-extruded through a 5-layers T-die, cooled with chill roll at 25° C., then longitudinal stretching was performed, the pre-heating temperature and stretching temperature for longitudinal stretching were both 100° C., annealing temperature was 110° C., and stretch rate was 1.2; then transversal stretching was performed, the pre-heating temperature for transversal stretching was 115° C., stretching temperature was 85° C., annealing temperature was 70° C., wind cooling temperature was 25° C., and stretch rate was 5.5, then the obtained film was subjected to corona treatment so that the film surface had a surface tension of 43 dyne/cm, following winding and slitting, and finally packed and stored.

The film had the following thicknesses: the external and internal surface layers separately had thickness of 2 μm, the external and internal sub-surface layers separately had thickness of 5 μm, the core layer had thickness of 31 μm, and the total thickness was 45 μm. The longitudinal and transversal tensile strengths, longitudinal and transversal fracture nominal strains, longitudinal and transversal shrinkage rates, fraction coefficient, stretch elastic modulus in longitudinal and transversal directions, surface tension, haze and glossiness of the film were shown in Table 1.

EXAMPLE 2

The composition for internal and external surface layers was composed of 80 wt % of ethylene-norbornene copolymer having Tg of 138° C. and norbornene content of 76 wt % (manufactured by Treasure Plastic Co., Ltd, TOPAS 6013F-04), and 20 wt % of ethylene-propylene random copolymer having Tm of 140° C. (manufactured by Lyondell Basell Company, CLYRELL RC1890); while the internal and external sub-surface layers, the core layer and the preparation method were the same as Example 1.

The film had the following thicknesses: the external and internal surface layers separately had thickness of 2 μm, the external and internal sub-surface layers separately had thickness of 5 μm, the core layer had thickness of 31 μm, and the total thickness was 45 μm. The longitudinal and transversal tensile strengths, longitudinal and transversal fracture nominal strains, longitudinal and transversal shrinkage rates, fraction coefficient, stretch elastic modulus in longitudinal and transversal directions, surface tension, haze and glossiness of the film were shown in Table 1.

EXAMPLE 3

The composition for internal and external sub-surface layers was composed of 60 wt % of ethylene-norbornene copolymer having Tg of 78° C. and norbornene content of 65 wt % (manufactured by Treasure Plastic Co., Ltd, TOPAS 8007F-400), and 40 wt % of hydrogenated petroleum resin having softening point of 140° C. (manufactured by Idemitsu Kosan Co., Ltd, P140); while the internal and external surface layers, the core layer and the preparation method were the same as Example 1.

The film had the following thicknesses: the external and internal surface layers separately had thickness of 2 μm, the external and internal sub-surface layers separately had thickness of 5 μm, the core layer had thickness of 31 μm, and the total thickness was 45 μm. The longitudinal and transversal tensile strengths, longitudinal and transversal fracture nominal strains, longitudinal and transversal shrinkage rates, fraction coefficient, stretch elastic modulus in longitudinal and transversal directions, surface tension, haze and glossiness of the film were shown in Table 1.

EXAMPLE 4

A three-layered co-extrusion structure was used, which specific structure was as follows: internal and external surface layers were composed of 70 wt % of ethylene-norbornene copolymer having Tg of 138° C. and norbornene content of 76 wt % (manufactured by Treasure Plastic Co., Ltd, TOPAS 6013F-04), and 30 wt % of ethylene-propylene random copolymer having Tm of 140° C. (manufactured by Lyondell Basell Company, CLYRELL RC1890).

The core layer composition was composed of 54 wt % of ethylene-propylene random copolymer having Tm of 140° C. (manufactured by Lyondell Basell Company, CLYRELL RC1890), 20 wt % of ethylene-norbornene copolymer having Tg of 78° C. and norbornene content of 65 wt % (manufactured by Treasure Plastic Co., Ltd, TOPAS 8007F-400), 8 wt % of ethylene-butylene random copolymer having Tm of 66° C. (manufactured by Mitsui Chemicals Inc, A4085S), and 18 wt % of a hydrogenated petroleum resin having Ts of 140° C. (manufactured by Idemitsu Kosan Co., Ltd, P140).

The polyolefin heat shrinkable film was prepared by the following method: raw materials for blending were separately poured into extruder at 185-250° C., co-extruded through a 3-layers T-die, cooled with chill roll at 25° C., then longitudinal stretching was performed, the pre-heating temperature and stretching temperature for longitudinal stretching were both 100° C., annealing temperature was 110° C., and stretch rate was 1.2; then transversal stretching was performed, the pre-heating temperature for transversal stretching was 115° C., stretching temperature was 85° C., annealing temperature was 70° C., wind cooling temperature was 25° C., and stretch rate was 5.5, then the obtained film was subjected to corona treatment so that the film surface had a surface tension of 43 dyne/cm, following winding and slitting, and finally packed and stored.

The film had the following thicknesses: the external and internal surface layers separately had thickness of 7 μm, the core layer had thickness of 31 μm, and the total thickness was 45 μm. The longitudinal and transversal tensile strengths, longitudinal and transversal fracture nominal strains, longitudinal and transversal shrinkage rates, fraction coefficient, stretch elastic modulus in longitudinal and transversal directions, surface tension, haze and glossiness of the film were shown in Table 1.

COMPARATIVE EXAMPLE 1

A three-layered co-extrusion structure was used, which specific structure was as follows: internal and external surface layers were composed of 70 wt % of ethylene-norbornene copolymer having Tg of 78° C. and norbornene content of 65 wt % (manufactured by Treasure Plastic Co., Ltd, TOPAS 8007F-400), and 30 wt % of LLDPE (manufactured by Mitsui Chemical Inc., SP3020), while the core layer and the preparation method were the same as Example 4.

The film had the following thicknesses: the external and internal surface layers separately had thickness of 7 μm, the core layer had thickness of 31 μm, and the total thickness was 45 μm. The longitudinal and transversal tensile strengths, longitudinal and transversal fracture nominal strains, longitudinal and transversal shrinkage rates, fraction coefficient, stretch elastic modulus in longitudinal and transversal directions, surface tension, haze and glossiness of the film were shown in Table 1.

As can be seen from the comparison, there is an obvious adhesion by using polyolefin heat shrinkable film of Comparative Example 1 in bundle-shrink pack using PE heat-shrinkable film, which do not meet appearance quality requirement for heat shrinkable sleeve label of canned drink.

TABLE 1

| | | Example 1 | Example 2 | Example 3 | Example 4 | Comparative Example 1 |
|---|---|---|---|---|---|---|
| Tensile strength (MPa) | Longitudinal | 40 | 46 | 42 | 47 | 36 |
| | Transversal | 115 | 127 | 117 | 134 | 107 |
| Fracture nominal strain (%) | Longitudinal | 289 | 288 | 289 | 282 | 291 |
| | Transversal | 24 | 21 | 22 | 21 | 32 |
| Heat shrinkage rate (%) | Longitudinal | 3 | 3 | 3 | 3 | 3 |
| | Transversal | 41.5 | 41 | 43 | 40.5 | 46 |
| Friction coefficient | Static | 0.45 | 0.44 | 0.45 | 0.45 | 0.44 |
| | Dynamic | 0.39 | 0.38 | 0.39 | 0.38 | 0.39 |
| Stretch elastic modulus (MPa) | Longitudinal | 896 | 939 | 912 | 945 | 874 |
| | Transversal | 1419 | 1503 | 1485 | 1530 | 1397 |
| Surface tension, (mN/m) | | 43 | 43 | 43 | 43 | 43 |
| Haze (%) | | 6.5 | 5.6 | 5.1 | 6.8 | 4.5 |
| Glossiness (%) | | 61 | 65 | 65 | 60 | 69 |
| Adhesion test of bundle-shrink pack using PE heat-shrinkable film | | ⊙ | | | | x |

Notation:
⊙ represents that no adhesion with PE heat-shrinkable film was confirmed;
x represents that adhesion with PE heat-shrinkable film was confirmed.

What is claimed is:

1. A multilayer heat shrinkable film, which is a heat shrinkable polyolefin film with at least three laminated layers,
    wherein the multilayer heat shrinkable film is obtained by biaxial orienting,
    wherein the multilayer heat shrinkable film has a middle layer as a core layer, two sides of the core layer each have a surface layer, and the surface layer comprises 70-80 wt % of a first ethylene-norbornene copolymer having a glass-transition temperature Tg of 138° C. and 20-30 wt % of a first ethylene-propylene random copolymer having a melting point Tm of 140° C., and
    wherein the core layer comprises 54 wt % of a second ethylene-propylene random copolymer (A) having a melting point Tm of 140° C., 8 wt % of an ethylene-butylene random copolymer (B) having a melting point Tm of 66° C., 20 wt % of a second ethylene-norbornene copolymer (C) having a glass-transition temperature Tg of 78° C., and 18 wt % of a first hydrogenated petroleum resin (D) having a softening point Ts of 140° C.

2. The multilayer heat shrinkable film according to claim 1, further comprising:
    sub-surface layers disposed between the core layers and the surface layer,
    wherein the sub-surface layers each comprise 60-90 wt % of a third ethylene-norbornene copolymer having a glass-transition temperature Tg of 78° C., and 10-40 wt % of a second hydrogenated petroleum resin having softening point Ts of 140° C.

3. The multilayer heat shrinkable film according to claim 1, wherein
    the first and second ethylene-propylene random copolymers have an ethylene content of 6.5 wt %, and
    the ethylene-butylene random copolymer has a butylene content of 25 wt %.

4. The multilayer heat shrinkable film according to claim 2, wherein
    the second ethylene-norbornene copolymer in the core layer and third ethylene-norbornene copolymer in the sub-surface layers are the same,
    the second and third ethylene-norbornene copolymers each have a norbornene content of 65 wt % and a glass-transition temperature Tg of 78° C., and
    the ethylene-norbornene copolymer in the surface layers has a norbornene content of 76 wt % and glass-transition temperature Tg of 138° C.

5. The multilayer heat shrinkable film according to claim 1, wherein the multilayer heat shrinkable film has a transversal heat shrinkage rate of not less than 40% under the condition that the multilayer heat shrinkable film is dipped in 90° C. water for 10 seconds.

6. The multilayer heat shrinkable film according to claim 1, wherein the multilayer heat shrinkable film has a longitudinal fracture nominal strain of 282-289%.

7. The multilayer heat shrinkable film according to claim 1, wherein the multilayer heat shrinkable film has a transversal tensile strength of 115-134 MPa.

8. The multilayer heat shrinkable film according to claim 1, wherein the multilayer heat shrinkable film has a transversal tensile elastic modulus of 1419-1530 MPa.

9. A container, comprising:
    a container body; and
    a multilayer heat shrinkable polyolefin film attached to the container body by heat shrinking,
    wherein the multilayer heat shrinkable polyolefin film includes at least three laminated layers obtained by biaxial orienting,
    wherein the multilayer heat shrinkable polyolefin film has a middle layer as a core layer, sides of the core layer each having a surface layer, the surface layer comprising 70-80 wt % of a first ethylene-norbornene copolymer having a glass-transition temperature Tg of 138° C. and 20-30 wt % of a first ethylene-propylene random copolymer having a melting point Tm of 140° C.; and
    wherein the core layer comprises 54 wt % of a second ethylene-propylene random copolymer (A) having a melting point Tm of 140° C., 8 wt % of an ethylene-butylene random copolymer (B) having a melting point Tm of 66° C., 20 wt % of a second ethylene-norbornene copolymer (C) having a glass-transition temperature Tg of 78° C., and 18 wt % of a first hydrogenated petroleum resin (D) having a softening point Ts of 140° C.

10. The container according to claim 9, wherein
    the multilayer heat shrinkable film further has sub-surface layers disposed between the core layer and the surface layer, and
    the sub-surface layers each comprise 60-90 wt % of a third ethylene-norbornene copolymer having a glass-transition temperature Tg of 78° C., and 10-40 wt % of a second hydrogenated petroleum resin having a softening point of 140° C.

11. The container according to claim 9, wherein
the first and second ethylene-propylene random copolymers have an ethylene content of 6.5 wt %, and
the ethylene-butylene random copolymer has a butylene content of 25 wt %.

12. The container according to claim 10, wherein
the second ethylene-norbornene copolymer in the core layer and third ethylene-norbornene copolymer in the sub-surface layers are the same,
the second and third ethylene-norbornene copolymers each have a norbornene content of 65 wt % and a glass-transition temperature Tg of 78° C.; and
the first ethylene-norbornene copolymer in the surface layer has a norbornene content of 76 wt % and a glass-transition temperature Tg of 138° C.

13. The container according to claim 9, wherein the multilayer heat shrinkable film has a transversal heat shrinkage rate of not less than 40% under the condition that the multilayer heat shrinkable film is dipped in 90° C. water for 10 seconds.

14. The container according to claim 9, wherein the multilayer heat shrinkable film has a longitudinal fracture nominal strain of 282-289%.

15. The container according to claim 9, wherein the multilayer heat shrinkable film has a transversal tensile strength of 115-134 MPa.

* * * * *